(12) United States Patent
Guirguis

(10) Patent No.: US 11,524,626 B1
(45) Date of Patent: Dec. 13, 2022

(54) DEDICATED U-TURN SIGNAL LIGHT SYSTEM FOR MOTOR VEHICLES

(71) Applicant: Raafat Guirguis, Ellicott City, MD (US)

(72) Inventor: Raafat Guirguis, Ellicott City, MD (US)

( * ) Notice: Subject to any disclaimer, the term of this patent is extended or adjusted under 35 U.S.C. 154(b) by 0 days.

(21) Appl. No.: 17/339,862

(22) Filed: Jun. 4, 2021

(51) Int. Cl.
*B60Q 1/34* (2006.01)
*B60Q 1/50* (2006.01)

(52) U.S. Cl.
CPC ...... *B60Q 1/34* (2013.01); *B60Q 1/50* (2013.01)

(58) Field of Classification Search
USPC ........................................................ 340/475
See application file for complete search history.

(56) References Cited

U.S. PATENT DOCUMENTS

| | | | | |
|---|---|---|---|---|
| 4,994,786 A | * | 2/1991 | Schaffer | B60Q 1/381 340/463 |
| 8,519,840 B1 | * | 8/2013 | Banks | B60Q 1/34 340/475 |
| 2014/0091920 A1 | * | 4/2014 | Thompson | B60Q 1/38 340/475 |
| 2020/0298748 A1 | * | 9/2020 | Nam | B60W 30/18163 |
| 2021/0188163 A1 | * | 6/2021 | Kern | B60Q 1/28 |

* cited by examiner

*Primary Examiner* — Brent Swarthout

(57) ABSTRACT

A dedicated U-turn signal light system for motor vehicles will be added. This is achieved by introducing a U-turn signal light in the form of a green arc (or an alternative color adhering to the national motor vehicle codes) capping the existing conventional turn signals and activated where a U-turn is allowed. The U-turn arc signal will flash in an animated fashion and simultaneously with the conventional turn signal. This will apply on each direction (left or right). A revised design of the signal lever will be made to accommodate for two additional U-turn positions served by adding two U-turn slots in the signal lever control box. An additional two electrical switches will confirm simultaneous flashing of the conventional turn and U-turn signals.

5 Claims, 6 Drawing Sheets

F|G.1

DEDICATED U-TURN SIGNAL LIGHT SYSTEM FOR MOTOR VEHICLES

REFERENCES CITED

| U.S. Patent Documents | | |
|---|---|---|
| 4227174 | October 1980 | Belcher |
| 4994786 | February 1991 | Schaffer |
| 5663708 | September 1997 | Strawn |
| 2005/0237174 | October 2005 | Hu |
| 2012/0078511 | March 2012 | Lim |
| 8519840 | August 2013 | Banks |
| 2014/0091920 | April 2014 | Thompson |
| 2016/0031364 | February 2016 | Kerr |
| 9327635 | May 2016 | Scheck, et al |
| 9643533 | May 2017 | Houss |
| 10919442 | February 2021 | Arteiro, et al |

BACKGROUND OF THE INVENTION

Motor vehicles possess several exterior lights, such as head low beam lights, head high beam lights, taillights, hazard lights, brake lights, fog lights, reverse lights and turn signal lights. However, motor vehicles are not equipped with U-turn lights. A conventional turn signal is generally used to warn the surrounding vehicles of the intent of the signaling vehicle to change its direction, but does not accurately convey the intended direction of the vehicle as it is left to the guessing of the drivers of the surrounding vehicles whether the signaling vehicle will make a conventional turn or a U-turn. This guessing may subject the moving vehicle to a collision during its U-turn. The present invention adds a dedicated U-turn signal light system for a U-turn to the left and a separate U-turn to the right, which is predominantly used for turning on service roads, and hence eliminates any guessing by the surrounding drivers to the intent of the signaling vehicle.

FIELD OF THE INVENTION

The present invention relates to the addition of a U-turn signal light system to the existing light clusters for all vehicles and is dedicated to U-turn signaling. This will be activated via a revised design of the signal lever control box by adding two new slots for the two new U-turn signals for each left and right U-turns. U-turns are made when it is permitted on main and service roads. This can be applied for all vehicles including passenger cars, buses, trucks, trailers, recreational vehicles, construction equipment and all other motorized moving vehicles and equipment.

DESCRIPTION OF THE PRIOR ART

As the automobile industry evolved over years, its safety measures have also improved. Here are few examples: (a) the first backup lamp became standardized in the US in 1947, (b) the first ECE (Economic Commission for Europe) regulation came in 1974 and rear fog lamps were made compulsory in Europe in 1991. They are still not mandatory in the US, (c) the third brake light law went into effect in the US in 1986 for passenger cars and in 1994 for light trucks (d) in the US, amber front and red rear side marker lamps and reflectors became required.

Motor vehicles possess several exterior lights, such as head low beam lights, head high beam lights, taillights, hazard lights, brake lights, fog lights, reverse lights and turn signal lights. However, motor vehicles are not equipped with U-turn lights and hence rely on the guessing of the drivers surrounding the turning car. This has been a cause of many accidents as the surrounding vehicles, including the driver of the rear car, are unaware that the leading car is abruptly decelerating or braking, to allow for the U-turn to occur smoothly, which may cause a rear-end collision.

There are several previous inventions focused on improving the function and safety of the light signals of the vehicles. U.S. Pat. No. 9,327,635 presented an improvement in adding a control unit which controls energization to attract and/or repel the lever.

Additionally, few inventions highlighted the benefits to the safety of the vehicles and passengers by adding a U-turn signal to the clusters of the light signals. These inventions have limitations as addressed later.

U.S. Pat. No. 10,919,442 to Arteiro et al, presented a method for signaling the intention and execution of a U-turn maneuver by a motor vehicle by flashing the front headlight, the rear reverse light and the turn-signal light on the respective U-turning side of the turning vehicle. This creates confusion to the surrounding drivers by having three simultaneously flashing lights; front headlight, rear reverse light, turn signal light.

U.S. Pat. No. 9,643,533 to Houss presented an increased frequency rate for the conventional turn signals via a switch indicating a U turn. This lacks assurance to the surrounding drivers that a U-turn is about to occur and could be misunderstood by a regular driver that the signaling vehicle is simply making a conventional turn.

U.S. Pat. No. 8,519,840 to Banks presented a standalone U-turn light signal flashing independently with an overwhelming number of standalone U-turn indicators which could be distracting to surrounding drivers and adds unnecessary cost.

U.S. Pat. No. 5,663,708 to Strawn presented a two-colored light included in the front left and a rear left adjacent to the conventional turn signal with the U-turn light flashing independently upon activation which may confuse a surrounding driver not familiar with the intended purpose of the signaling vehicle as this is a standalone light that lacks any indication. Additionally, the surrounding drivers are only familiar with conventional turn signals as an indicator to potentially making a U-turn.

This present invention avoids the limitations and drawbacks aforementioned by confidently and subtly displaying U-turn signals for a left U-turn as well as a right U-turn with a corresponding green (or other color) animated arc, flashing simultaneously with the conventional turn signal whether within the left light clusters or the right light clusters respective to the turning direction. Each arc will be made of a clear frosted translucent cover and caps the respective conventional turn signal.

SUMMARY OF THE INVENTION

The present invention, adds a dedicated U-turn signal light system for motor vehicles which will activate the U-turn signals simultaneously with the conventional turn signals.

The signal lever in most vehicles is attached to the steering wheel. However, modern vehicles may have an alternate to the signal lever. The signal lever for our discussion will have two additional positions, one for the left U-turn and one for the right U-turn. The up and down directions of the lever are indicative to the two U-turns, left and right.

The signal lever control box already has slots for conventional left and right turn signals. This invention adds two additional slots, one for the left U-turn signals and the other for the right U-turn signals. Each U-turn signal is achieved by simultaneously activating the conventional turn signal and the relevant U-turn signal. This is conducted by the introduction of an electrical switch between the corresponding conventional turn signal slot and the U-turn signal slot in the signal lever control box. The already existing auto reverse magnetic switch will be activated automatically with the steering wheel and synchronized with the existing auto return to the zero mode (no signals are active).

The other improvements will be in the signal light clusters left and right and in the rear, front and sides of the vehicle. The left and right signals in the light clusters will include additional U-turn signal lights in the form of green arcs (or any other color in compliance with the national motor vehicle codes). Each U-turn signal light will be an animated flashing arc capping each of the corresponding conventional turn signal light in the rear, front and sides. The exact location of the U-turn signal light arc will be associated with the conventional turn signal which differs from one vehicle to another depending on the arrangement of the pertaining light modules. Each U-turn signal light will have a clear frosted translucent cover to ensure that it is obscured when not activated within the conventional turn signal. The U-turn signal light is achieved through moving the signal lever to a U-turn position which also moves to the U-turn slot in the signal lever control box. This activates both the U-turn signal light as well as the conventional turn signal light by closing the electrical switch between the conventional and the U-turn signal lights.

The invention provides a kit useful for new installations or retrofitting a motor vehicle with a dedicated U-turn signal system.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
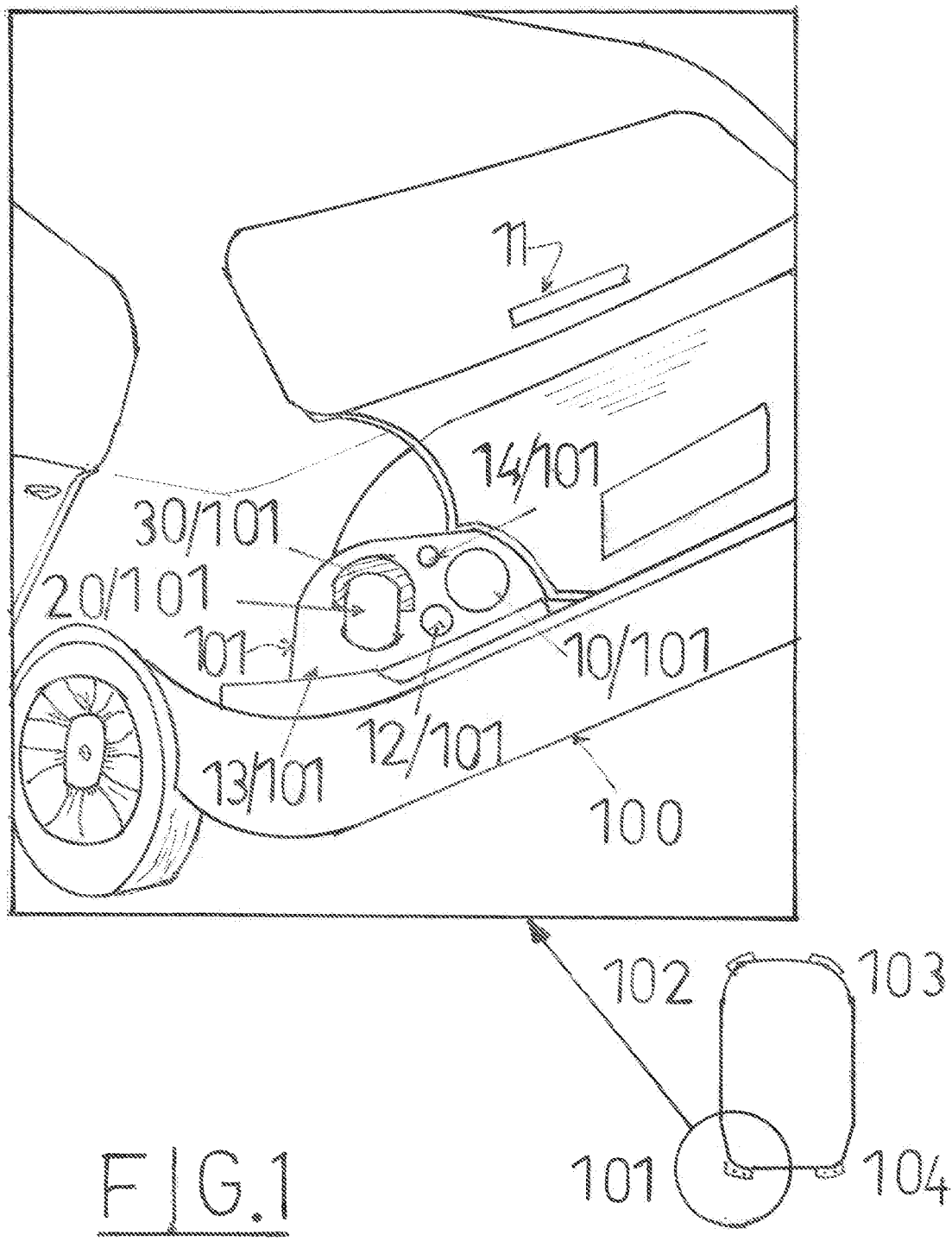
FIG. 1 is a perspective of a rear left view of a vehicle equipped with a dedicated U-turn signal light capping the conventional turn signal light in the rear cluster of the vehicle.

Referring to the drawings, wherein like reference numerals refer to like features throughout the several views. The drawings presented herein are not necessarily to scale and are provided purely for explanatory purposes. Thus, the specific and relative dimensions shown in the drawings are not to be considered limiting unless explicitly stated otherwise in the claims.

FIG. 1 illustrates a general view of an exemplary embodiment of the rear left light cluster (101) of a motor vehicle (100). The rear left light cluster (101) includes the rear left U-turn signal light (30/101) as an arc capping the rear left conventional turn signal light (20/101). The rear left light cluster (101) also includes the rear left brake light (10/101), rear left reverse light (12/101), rear left running light (13/101) and rear left fog light (14/101). The figure also shows high mounted stop light (11).

Figure 2:
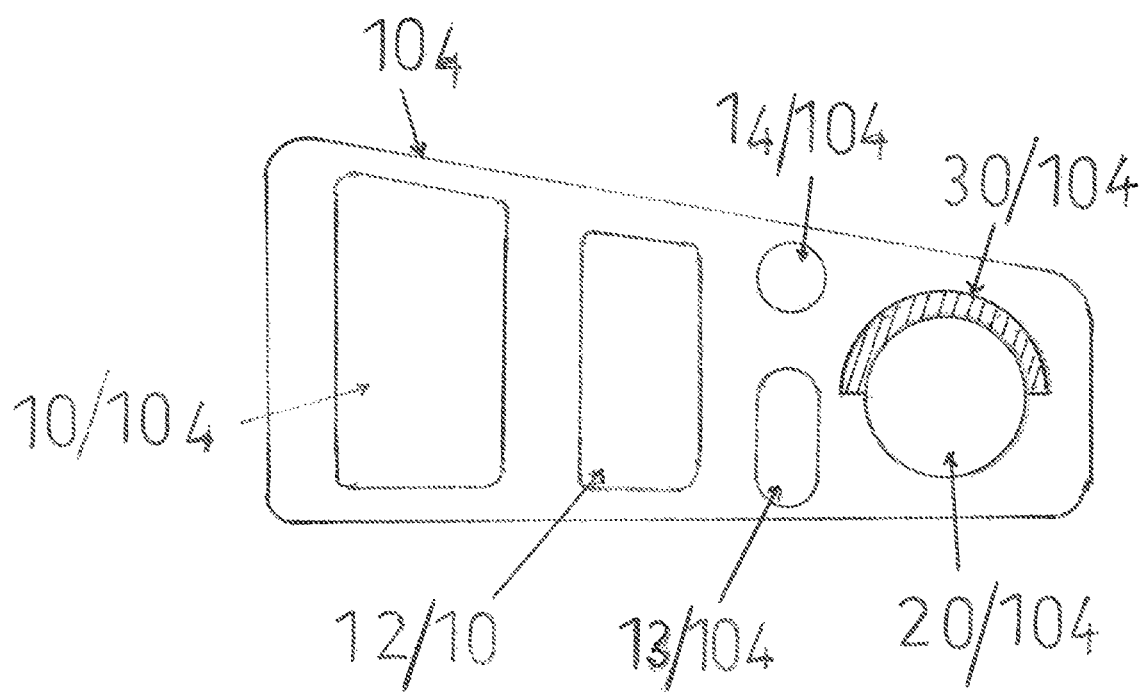
FIG. 2 is a schematic view of an example of a rear right light cluster showing a combination of lights including a dedicated U-turn signal light capping the conventional turn signal light.

FIG. 2 illustrates an example of a rear right light cluster (104) of a vehicle. It includes the rear right U-turn signal light (30/104) as an arc capping the rear right conventional turn signal light (20/104). The rear right light cluster (104) also includes the rear right brake light (10/104), rear right reverse light (12/104), rear right running light (13/104) and rear right fog light (14/104).

Figure 3:
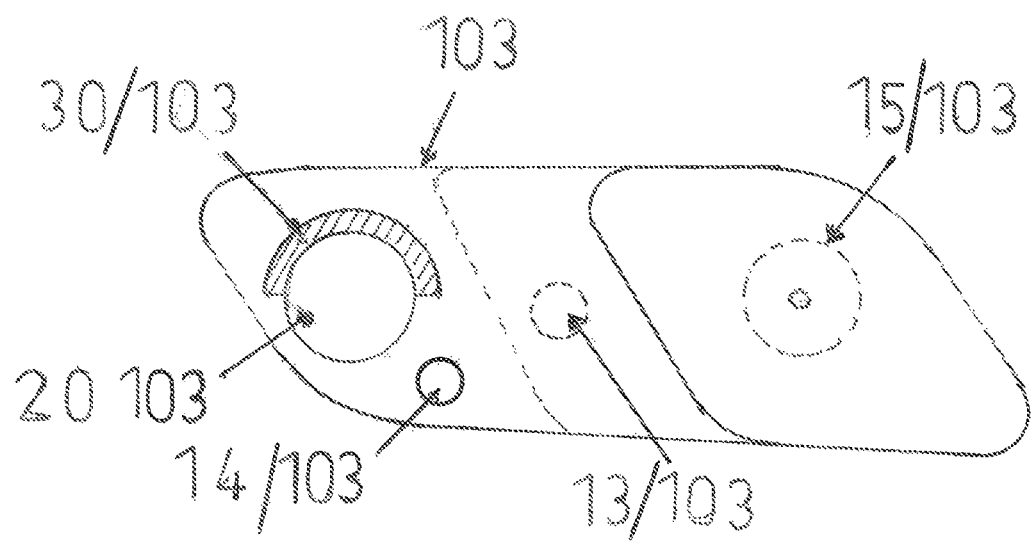
FIG. 3 is a schematic view of a front right light cluster showing a combination of lights including a dedicated U-turn signal light capping the conventional turn signal light.

FIG. 3 illustrates an example of a front right light cluster (103) of a motor vehicle. It includes the front right U-turn signal light (30/103) as an arc shape, capping the front right conventional turn signal light (20/103). The front right light cluster (103) also includes the front right running light (13/103), front right fog light (14/103) and the front right low beam/high beam (15/103).

Figure 4:
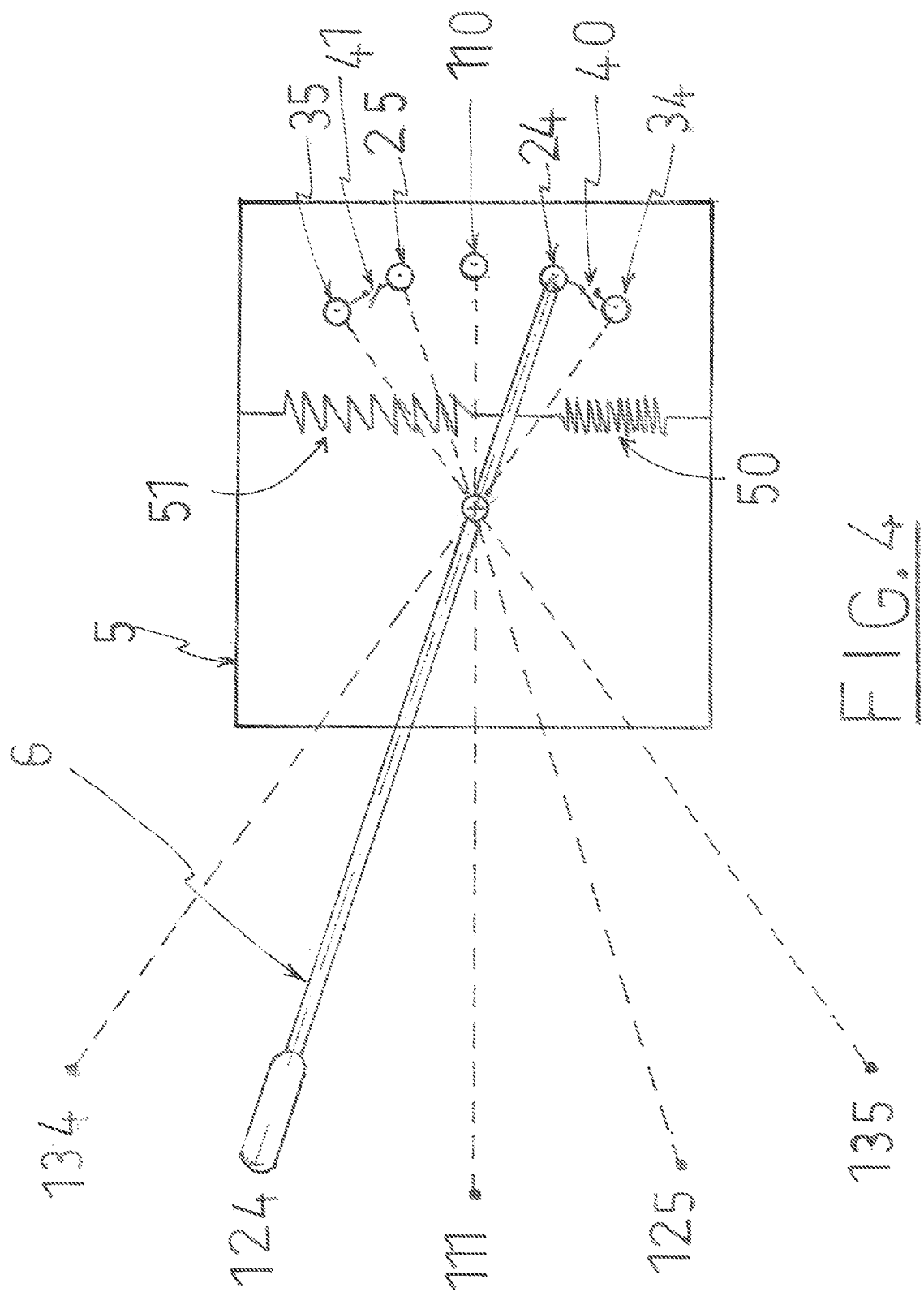
FIG. 4 is a schematic view of the turn signal lever control box depicting the signal slots for the conventional turn signals and newly added U-turn signal lights. Each U-turn signal light flashes simultaneously with the corresponding conventional turn signal light via its connecting electrical switch.

FIG. 4 illustrates a schematic drawing of the signal lever control box (5) which is generally attached to the steering wheel. It includes two slots, right conventional turn signal slot (24) and left conventional turn signal slot (25) for the conventional turn signals. Two additional slots are added, one for the right U-turn signal slot (34) and the other for the left U-turn signal slot (35). The signal lever (6) is the master lever that activates the function of the signals.

For making a left turn, the driver moves the signal lever (6) to the left turn position (125). This activates the rear left conventional turn signal light (20/101), the front left conventional turn signal light (20/102) and the left side conventional turn signal light.

If the driver intends to make a left U-turn, then he/she moves the signal lever (6) further to the left U-turn position (135). The movement of the signal lever (6) to the new position will cause the movement from left conventional turn signal slot (25) to the left U-turn signal slot (35) and closing the left electrical switch (41). This action causes simultaneous flashing of the rear left U-turn signal light (30/101), the rear left conventional turn signal light (20/101), front left U-turn signal light (30/102) and the front left conventional turn signal light (20/102). Additionally, this will also simultaneously flash the left side U-turn signal light for motor vehicles that allow for such a design and the left side turn signal light.

For making a right turn, the driver moves the signal lever (6) to the right conventional turn position (124). This activates the rear right conventional turn signal light (20/104), the front conventional right turn signal light (20/103) and the right side conventional turn signal light.

If the driver intends to make a right U-turn, then he/she moves the signal lever (6) further to the right U-turn position (134). The movement of the signal lever (6) to the new position will cause the movement from right conventional turn signal slot (24) to the right U-turn signal slot (34) and closing the right electrical switch (40). This action causes simultaneous flashing of the rear right U-turn signal light (30/104), the rear right conventional turn signal light (20/104), front right U-turn signal light (30/103) and the front right conventional turn signal light (20/103). Additionally, this will also simultaneously flash the right side U-turn signal light and the right side conventional turn signal light for motor vehicles that allow for such a design.

As in the case with a conventional turn signal, the signal lever (6) will be returned automatically to the zero position 111 after completion of a left U-turn signal or a right U-turn signal. The already existing auto reverse mechanism will be activated automatically with the steering wheel and synchronized with the existing auto return to the zero mode (no signals are active) assisted by the lower reverse spring (50) and upper reverse spring (51) to return the signal lever (6) to the neutral position (111) and neutral slot (110).

Figure 5:
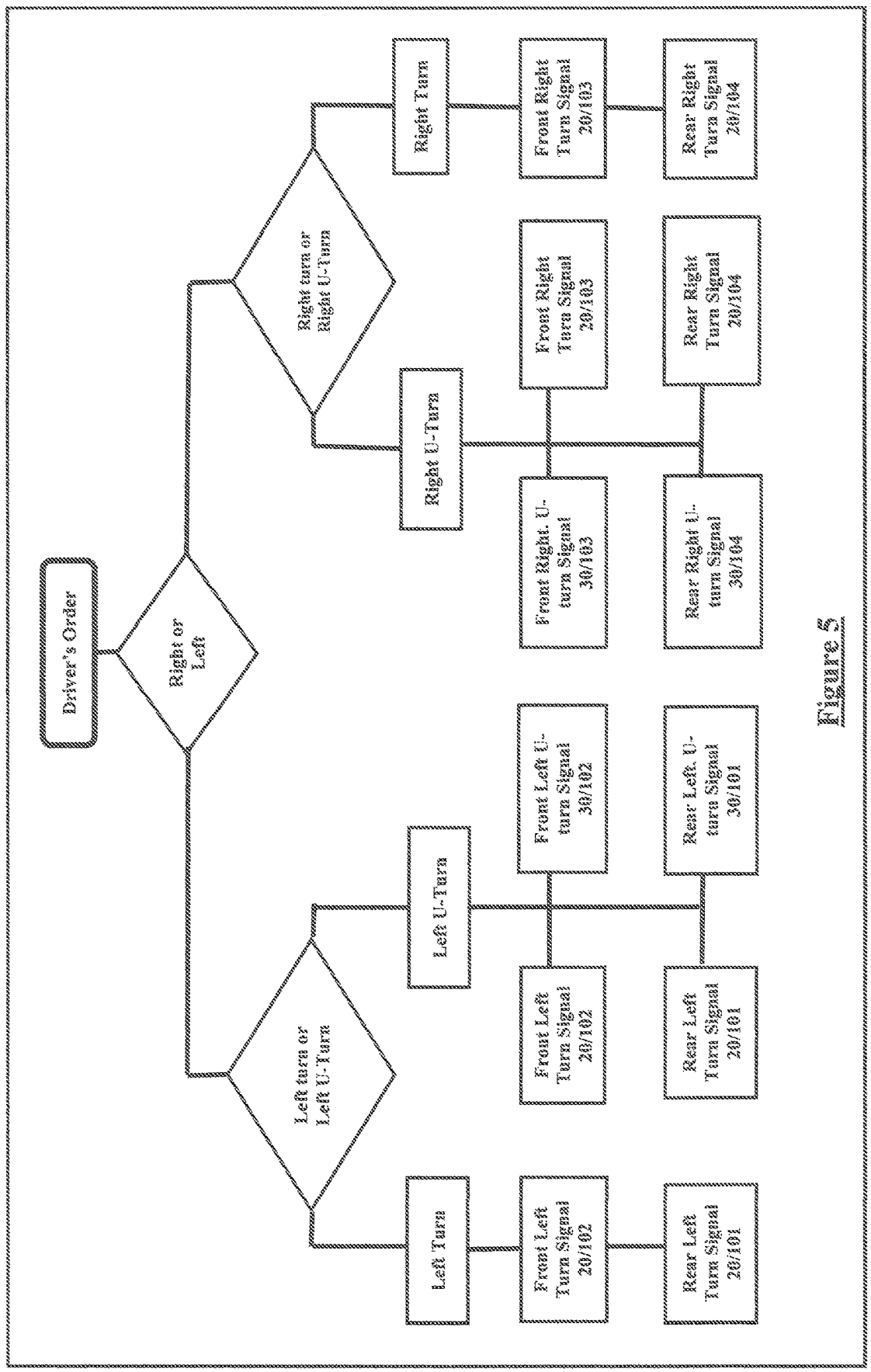
FIG. 5 is a flow chart diagram reflecting conventional turn signal lights and U-turn signal lights according to the invention.

FIG. 5 illustrates a flowchart depicting the various flashing scenarios of the conventional and U-turn signals. Upon making an order by the driver for a conventional left turn, only the front left conventional turn signal light (20/102) and the rear left conventional turn signal light (20/101) as well as the left side conventional turn signal light will flash. However, when a left U-turn is activated, both the front left conventional turn signal light (20/102), the rear left conventional turn signal light (20/101), the front left U-turn signal light (30/102), the rear left U-turn signal light (30/101) will all flash simultaneously at the front and rear as well as the left side conventional signal light and the left side U-turn signal light for motor vehicles that allow for such a design.

Upon making an order by the driver for a conventional right turn, only the front right conventional turn signal light (20/103) and the rear right conventional turn signal light (20/104) as well as the right side conventional turn signal light will flash. However, when a right U-turn is activated, both the front right conventional turn signal light (20/103), the rear right conventional turn signal light (20/104), the front right U-turn signal light (30/103) and the rear right U-turn signal light (30/104) will all flash simultaneously at the front and rear as well as the right side conventional signal light and the right side U-turn signal light for motor vehicles that allow for such a design.

Figure 6:
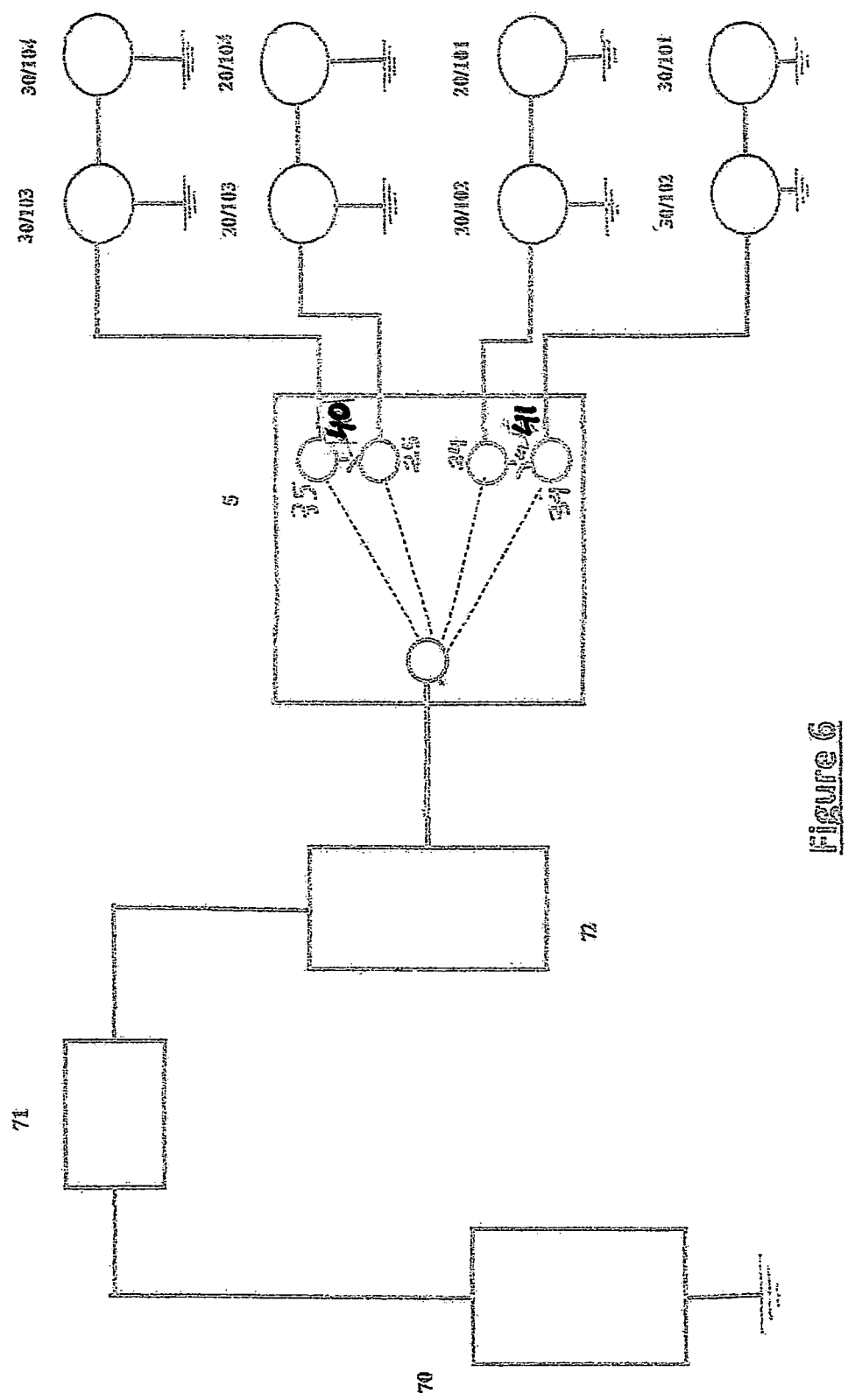
FIG. 6 is a schematic view depicting the interconnection of electrical components employed in the present invention.

FIG. 6 illustrates a single wiring diagram that includes the battery source (70) directed to the turn signal flasher (72) through the activation of the ignition (71). The turn signal flasher (72) sends power to the signal lever control box (5) which directs power to one of the four groups of light modules. Left conventional turn signal lights (20/102 and 20/101) or left U-turn signal lights (30/102 and 30/101) which also simultaneously activates through the left electrical switch (41) the left conventional turn signal lights (20/102 and 20/101) or right conventional turn signal lights (20/103 and 20/104) or right U-turn signal lights (30/103 and 30/104) which also simultaneously activates through the right electrical switch (40) the right conventional turn signal lights (20/103 and 20/104).

Figure 7:
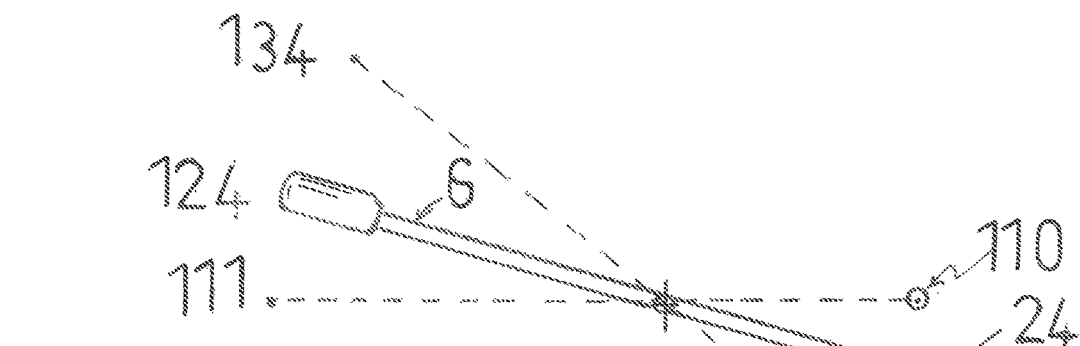
FIG. 7 is a schematic view depicting the signal lever showing the position for activation of a conventional turn signal light.

FIG. 7 illustrates a right conventional turn signal by having the driver move the signal lever (6) to the right turn position (124). This activates the rear conventional right turn signal light (20/104), the front right conventional turn signal light (20/103) and the right side conventional turn signal light. No other lights are activated as the right electrical switch (40) is open.

Figure 8:
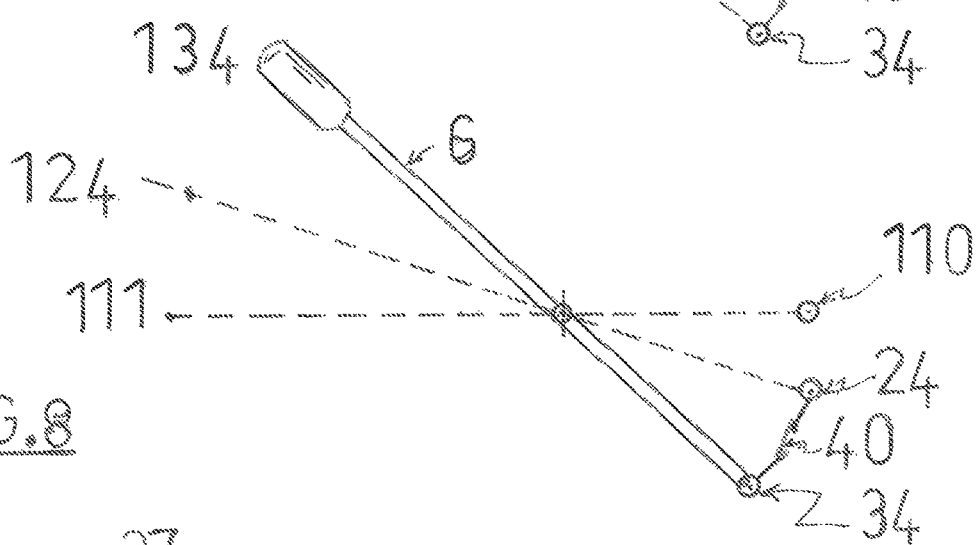
FIG. 8 is a schematic view depicting the signal lever showing the position for activation of a U-turn signal light, which simultaneously activates the conventional turn signal light via a corresponding connecting electrical switch.

FIG. 8 illustrates a right U-turn signal by having the driver moves the signal lever (6) further to the right U-turn position (134). The movement of the signal lever (6) to the new position will cause the movement from right conventional turn signal slot (24) to the right U-turn signal slot (34) and closing the right electrical switch (40). This action causes simultaneous flashing of the rear right U-turn signal light (30/104), the rear right conventional turn signal light (20/104), front right U-turn signal light (30/103) and the front right conventional turn signal light (20/103). Additionally, this will also simultaneously flash the right side U-turn signal light and the right side conventional turn signal light for motor vehicles that allow for such a design.

Figure 9:
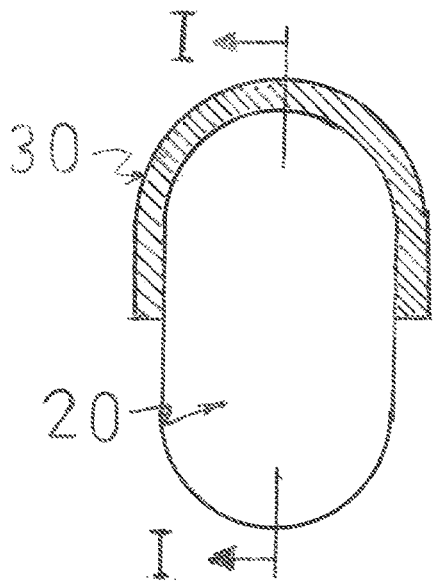
FIG. 9 is a schematic view showing a conventional turn signal light capped by a U-turn signal in a light cluster.

FIG. 9 illustrates a conventional turn signal (20) capped with a U-turn signal (30).

Figure 10:
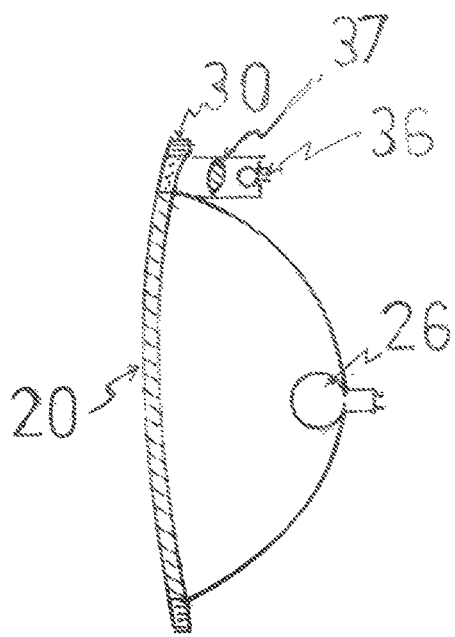
FIG. 10 is a cross section through a conventional turn signal light and a U-turn signal light showing the light components.

FIG. 10 illustrates a cross section depicting conventional turn signal bulb (26) and U-turn arc animated light (36) with lens (37) an U-turn signal (30).

What is claimed as being new and desired to be protected by Letters Patent of the United States is as follows:

1. A dedicated U-turn signal light system for a motor vehicle comprising:
    a directional turn signal lever,
    front and rear directional turn signal lights on right and left sides of the vehicle,
    a directional turn signal lever control box with electrical circuitry for activating turn signal lights based on which slot the signal lever is positioned in,
    the control box including first and second slots for right and left turn indications and two additional slots,
    wherein when the signal lever is positioned a first left U-turn additional slot left turn signal lights and left U-turn lights are simultaneously activated,
    and when the signal lever is positioned in a second right U-turn additional slot, right turn signal lights and right U-turn lights are simultaneously activated,
    the system including two electrical switches for providing simultaneous activation of turn signal lights and U-turn lights depending on which of the additional slots the signal lever is positioned in,
    the right and left U-turn lights positioned in respective right and left front and rear turn signal light housing clusters,
    and also, in housings at left and right side locations on the vehicle.

2. A dedicated U-turn signal light system for motor vehicle of claim 1, wherein the signal lever control box comprising two additional U-turn signal slots, one for activation of the right U-turn signal adjacent to the right turn signal slot and the other for the left U-turn signal adjacent to the left turn signal slot.

3. A dedicated U-turn signal light system for motor vehicle of claim 1, wherein the signal lever control box comprising two electrical switches connecting on the activation of the directional turn signal lever in the U-turn signal slots with the right and left turn signal slots, one electrical switch is connecting the right U-turn signal slot with the right turn signal activated on ordering right U-turn light and the other is connecting the left U-turn signal slot with the left turn signal activated on ordering left U-turn light.

4. A dedicated U-turn signal light system for motor vehicle of claim 1, wherein adding U-turn signal light to the front and back light clusters comprising a specified visible and recognized colored arc as defined by the National Motor Vehicle Code, animated or blinking or flashing or intermittent lighting capping the conventional turn signal.

5. A dedicated U-turn signal light system for motor vehicle of claim 1, wherein the right and left turn signal lights comprising of a U-turn signal light arc shape capping the corresponding turn signal light flashing simultaneously on activating the U-turn signal.

\* \* \* \* \*